UNITED STATES PATENT OFFICE.

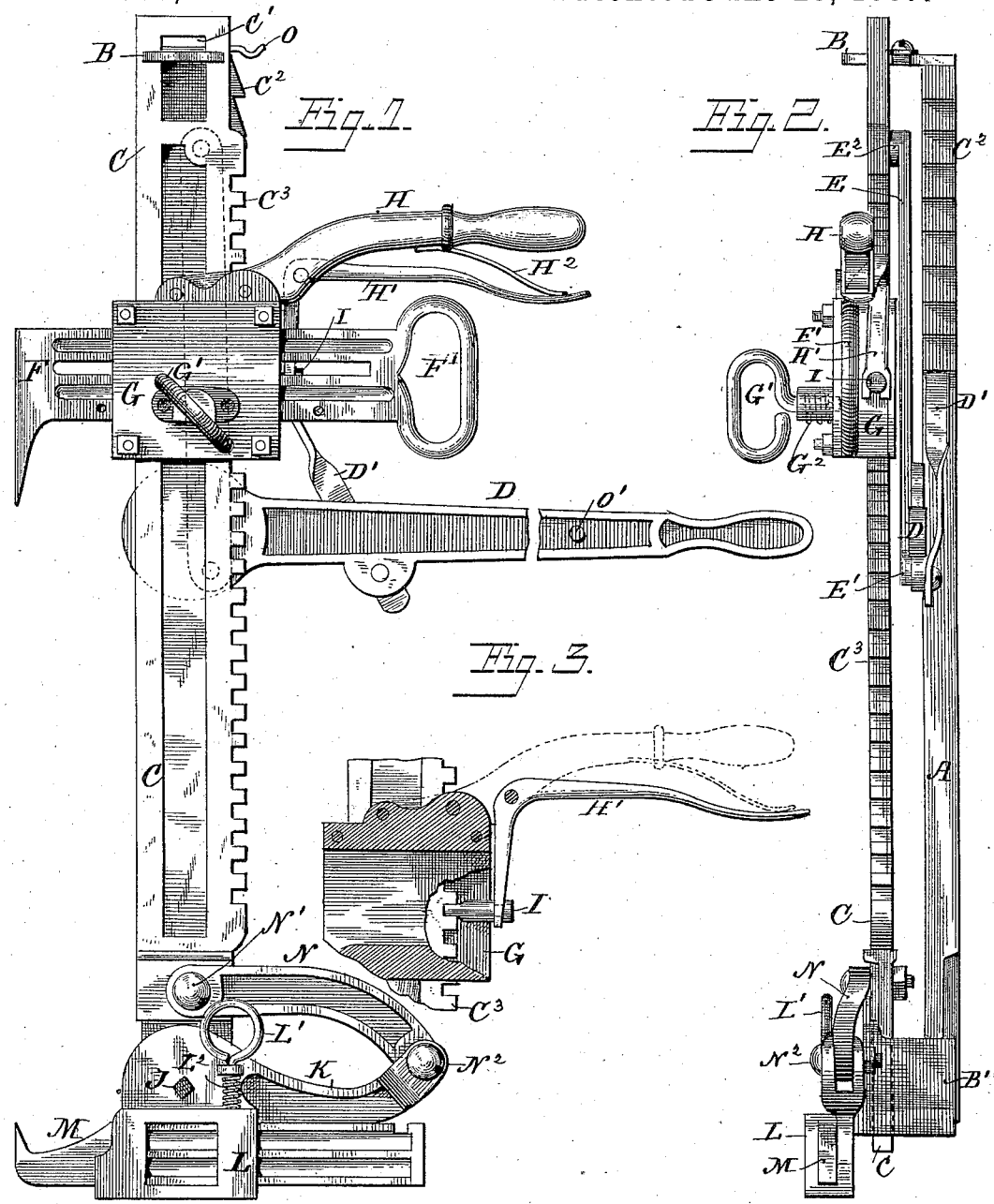

JOHN ACKERMAN AND JAMES C. BLAIR, OF COLUMBUS, OHIO; SAID BLAIR ASSIGNOR TO SAID ACKERMAN.

SAW-MILL DOG.

SPECIFICATION forming part of Letters Patent No. 365,661, dated June 28, 1887.

Application filed October 4, 1884. Serial No. 144,729. (No model.)

*To all whom it may concern:*

Be it known that we, JOHN ACKERMAN and JAMES C. BLAIR, citizens of the United States, residing at Columbus, in the county of Franklin and State of Ohio, have invented certain new and useful Improvements in Saw-Mill Dogs, of which the following is a specification, reference being had therein to the accompanying drawings.

This invention has relation to saw-mill dogs, and has for its object the provision of improved means for the operation of both dogs through the medium of a single lever, and the provision of other details of construction which shall increase the simplicity, serviceability, and convenience of the mechanism as a whole.

The invention consists in certain features of construction, hereinafter described, the novel features of which are specifically set forth in the claims.

Referring to the drawings, Figure 1 is a side elevation, Fig. 2 a rear edge view, and Fig. 3 a detail, partly in section, of a saw-mill dog constructed in accordance with our invention.

Like letters indicate like parts in all the figures.

The main standard A is provided at its upper end with a T-projection, B, which passes through a slot, C', of the sliding lifting-bar C. The lower end of the standard is provided with or secured to a block, B', which is slotted for the reception therein of the lower end of the lifting-bar C. The main lifting-lever D is centrally pivoted to the standard A, and is provided with a pawl, D', which meshes with a ratchet, C², formed on the edge of the standard A. A connecting-rod, E, is pivotally secured to the lever D at E', and to the lifting-bar C at E², so that by raising and lowering the free end of the lever D the lifting-bar is raised and lowered, moving in a line parallel with the standard A by reason of the slotted block B' and the T-projection B riding in the slot C'. The lifting-bar is provided with a rack, C³, along its rear edge. The upper dog, F, is mounted in a bearing-block, G, so as to slide therein at a right angle to the standard and to the lifting-bar. A pull-pin, G', passes through the wall of the bearing-block and enters depressions or holes formed in the side of the dog. A coiled spring, G², encircles the pull-pin and acts to force the pin toward the dog, so that by taking hold of the handle F' of the dog F and of the pull-pin G' the latter may be withdrawn from the recess and the dog moved within the bearing, so that its point may be adjustably secured at different distances from the standard and from the lifting-bar. From the upper face of the bearing-block projects a handle, H, which is rigidly secured to said block, and provided with a bell-crank lever, H', one arm of which projects beneath the handle H, and is forced therefrom by a spring, H², and the other arm of which is made to embrace a pin, I, which passes through the end wall of the bearing-block G, and is adapted to mesh in the rack C³ of the lifting-bar, so that by taking hold of the handle H and bringing the lever H' toward it the pin I is withdrawn from the rack C³, and the bearing-block and its dog may then be moved at will up or down the lifting-bar, in order to adjust the upper dog to logs of varied diameters, and when at the desired point it is only necessary to release the free end of the lever H', which is depressed by the spring H², when the pin will be thrown into connection with the rack. It will be noticed that the pin has a direct action with the rack and holds the bearing-block and dog firmly in the desired position, thereby being more satisfactory in practical use than a pawl and ratchet or a wedge when used for the purpose mentioned.

To the block B', by means of the bolt J, is pivoted a rock-arm, K, which is provided with a bearing-block, L, for the lower dog, M. A pull-pin, L', which is pressed by a spring, L², is arranged above the block L, and passes through the same and into depressions (not shown) in the upper edge of the lower dog, M, whereby lateral adjustment or the distance of projection of the dog M may be adjusted at will. The rock-arm K is connected with and operated by the lifting-bar C by means of a link, N, and pivots N' N², so that as the lifting-bar is reciprocated the arm K is oscillated on the bolt J, and therefore the point of the dog M is moved in the arc of a circle, the center of which is the bolt J. Now, it will be noticed that when the outer end of the lever D is elevated the link E elevates the lifting-bar, and this, through the medium of the link N, elevates the outer arm of the rock-arm K and depresses its inner end, and therefore also depresses the point of the dog M, so that the points of the upper and lower dog are separated by elevating the outer end of the lever D. This operation is performed at the time of the reception of the log upon the mill-carriage, which log is to be clamped and held in position by the dogs. When the log is in position, a downward movement at the free end of the lever D depresses the lifting-bar and the dog F mounted thereon, and at the same time elevates the point of the dog M through the medium of the link N and rock-arm K. When brought toward each other, as described, the dogs are secured against separation by throwing the pawl D' into the teeth of the ratchet C². A spring-latch, O, is secured to the top of the standard in order to retain the lever D in an upright position (and the dogs separate from each other) by the passage of the pin O' projecting from said lever beneath the spring-latch. The rearward projection of the rock-arm K and the connecting-link N gives a powerful leverage upon the dog M, whereby it can be securely forced into a log, while at the same time the relative proportions existing between the lever D and the point of connection therewith of the link E constitutes means whereby an immense leverage is secured upon the upper dog, so that both dogs are adapted to hold securely any log into which they are forced.

Having described our invention and its operation, what we claim is—

1. In a saw-mill dog, the combination of a standard, a lever pivoted thereto, a vertical sliding lifting-bar provided with rack-teeth, a connecting-rod pivoted to said bar and eccentrically to the lever, a lower bearing-block mounted on the standard, and a rock-arm on said bearing-block, carrying a sliding dog and connected to the sliding bar by a link secured at one end to said lifting-bar, and pivoted at the other to said rock arm, substantially as specified.

2. The combination of the rock-arm K, having the bearing-box L for the lower dog, and the pull-pin L', with the lower dog, M, substantially as shown and described.

3. The combination of the standard A, block B' at the lower end, the rock-arm K, pivoted to said block upon the bolt J, the lower dog, M, its bearing-block L, the link N, pivoted at one end to the arm K, and secured at the other to the sliding bar C, and sliding bar C, together with means for operating said bar, substantially as shown and described.

In testimony whereof we affix our signatures in presence of two witnessss.

JOHN ACKERMAN.
JAMES C. BLAIR.

Witnesses:
C. C. SHEPHERD,
HENRY C. TAYLOR.